June 27, 1950  F. CARTLIDGE  2,512,610
ARTICULATED CONVEYER
Filed June 25, 1947  3 Sheets-Sheet 1

INVENTOR
Frank Cartlidge
Clarence F. Poole
Attorney

June 27, 1950   F. CARTLIDGE   2,512,610
ARTICULATED CONVEYER
Filed June 25, 1947   3 Sheets-Sheet 2
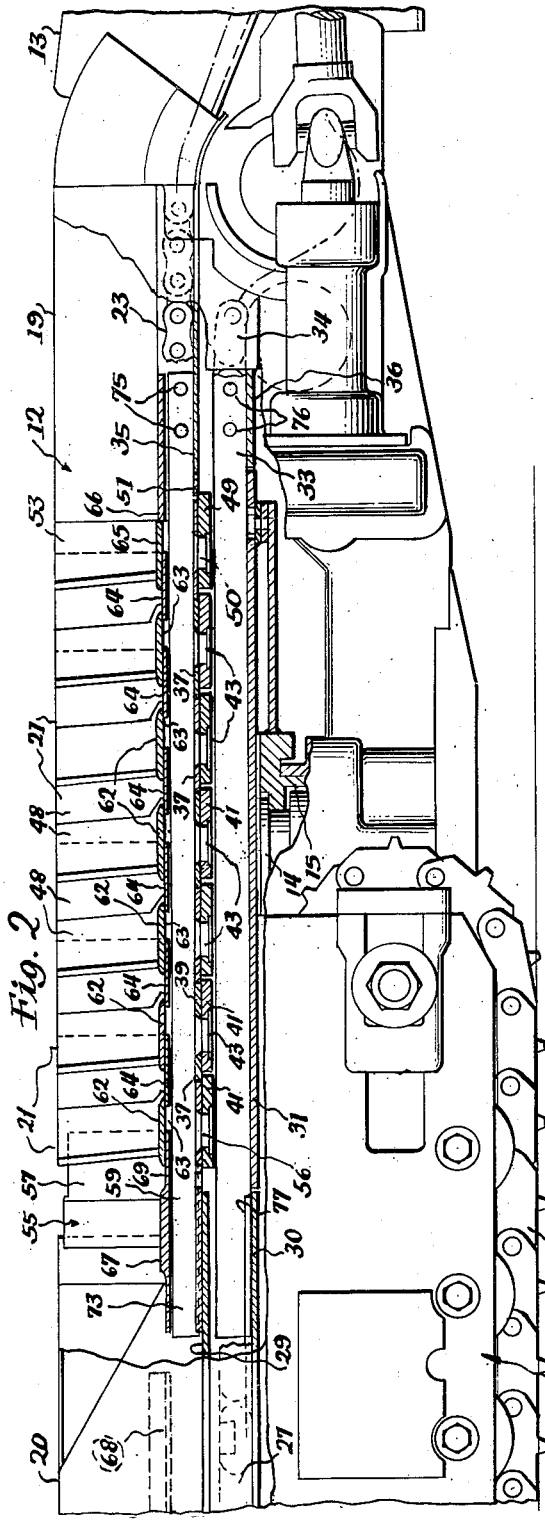
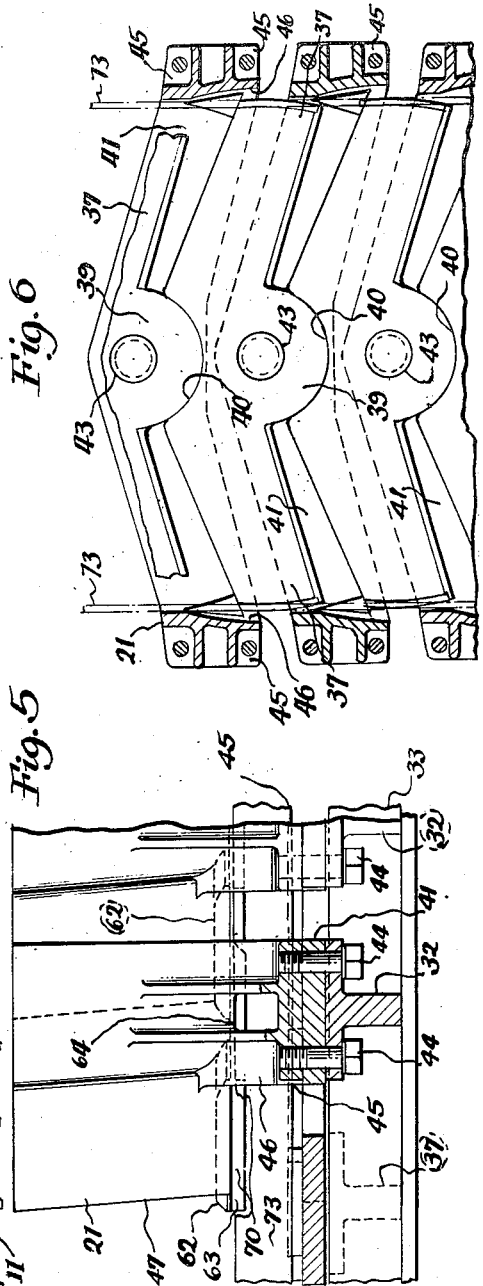
INVENTOR
Frank Cartlidge
Attorney

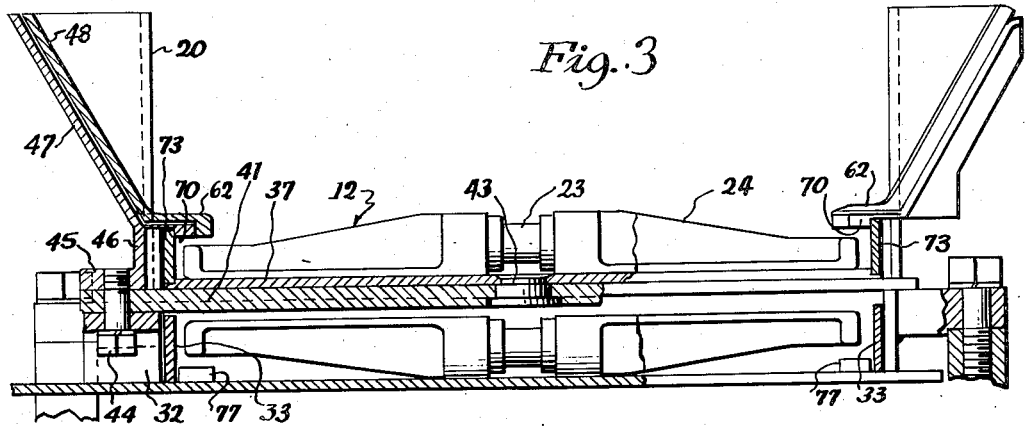
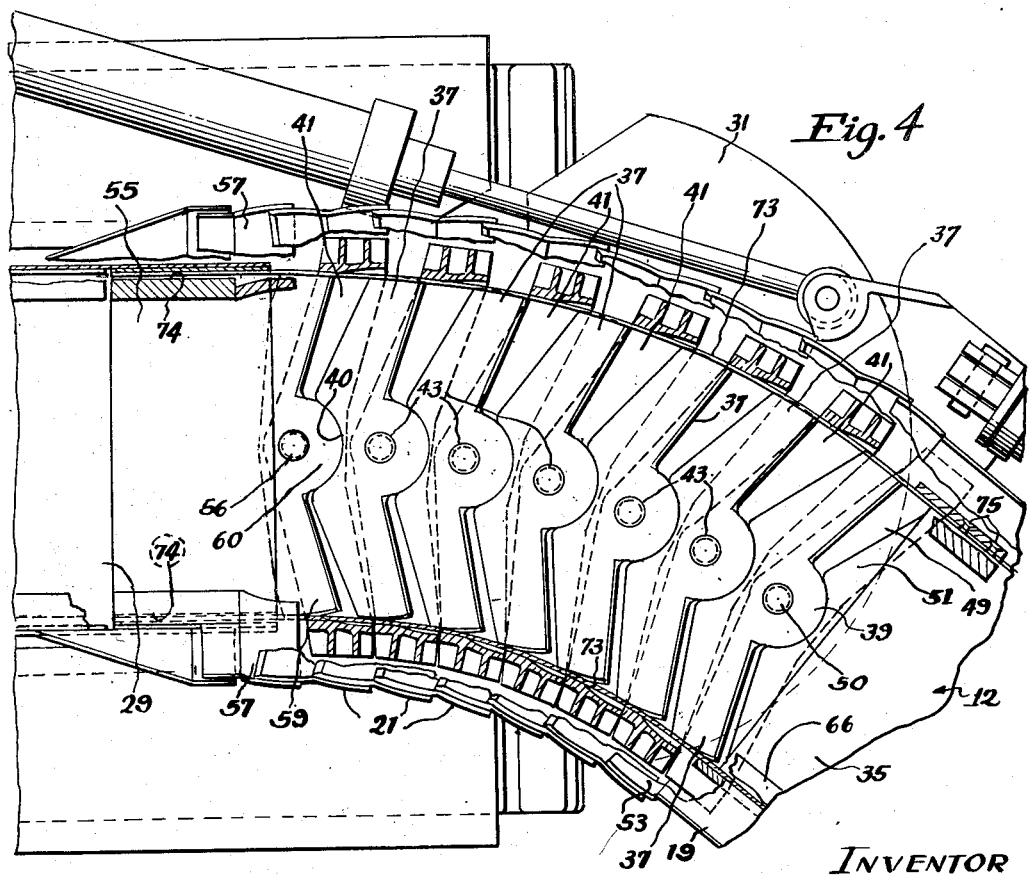

Patented June 27, 1950

2,512,610

UNITED STATES PATENT OFFICE 2,512,610

ARTICULATED CONVEYER

Frank Cartlidge, Chicago, Ill., assignor to Goodman Manufacturing Company, Chicago, Ill., a corporation of Illinois Application June 25, 1947, Serial No. 756,973

7 Claims. (Cl. 198—109)

This invention relates to improvements in articulated conveyors of the center strand endless chain and flight type particularly adapted for use on coal loading machines operable at the working face of a mine.

The principal objects of my invention are to provide a new and improved articulated conveyor having a novel, efficient, and simplified form of segmental form of trough construction for a center strand chain and flight conveyor, bridging the gap between two spaced apart troughs one of which is laterally and vertically swingable with respect to the other, which is so arranged as to provide a uniform guide for the chain of the conveyor on the ends of its flights in all positions of articulation of the conveyor, and to hold the chain and flights to travel in planes substantially parallel to the material carrying surfaces of the conveyor when the swingable trough is in an inclined and laterally extended position with respect to the stationary trough of the conveyor.

My present invention is somewhat similar to the disclosures of my prior Patents Nos. 2,208,269 and 2,239,778, but differs therefrom in the form and arrangement of the intermediate trough segments and the guiding means for the chain as it passes therealong.

This and other objects of my invention will more clearly appear as this specification proceeds and with reference to the drawings wherein:

Figure 2 is a partial fragmentary view in side elevation of the forward part of a loading machine having a conveyor constructed in accordance with my invention embodied therein, with certain parts of the conveyor and loading machine shown in substantially longitudinal section;

Figure 3 is a transverse sectional view taken substantially along line 3—3 of Figure 1;

Figure 4 is a fragmentary plan view showing the conveyor pivoted laterally to one extreme position of adjustment;

Figure 1:
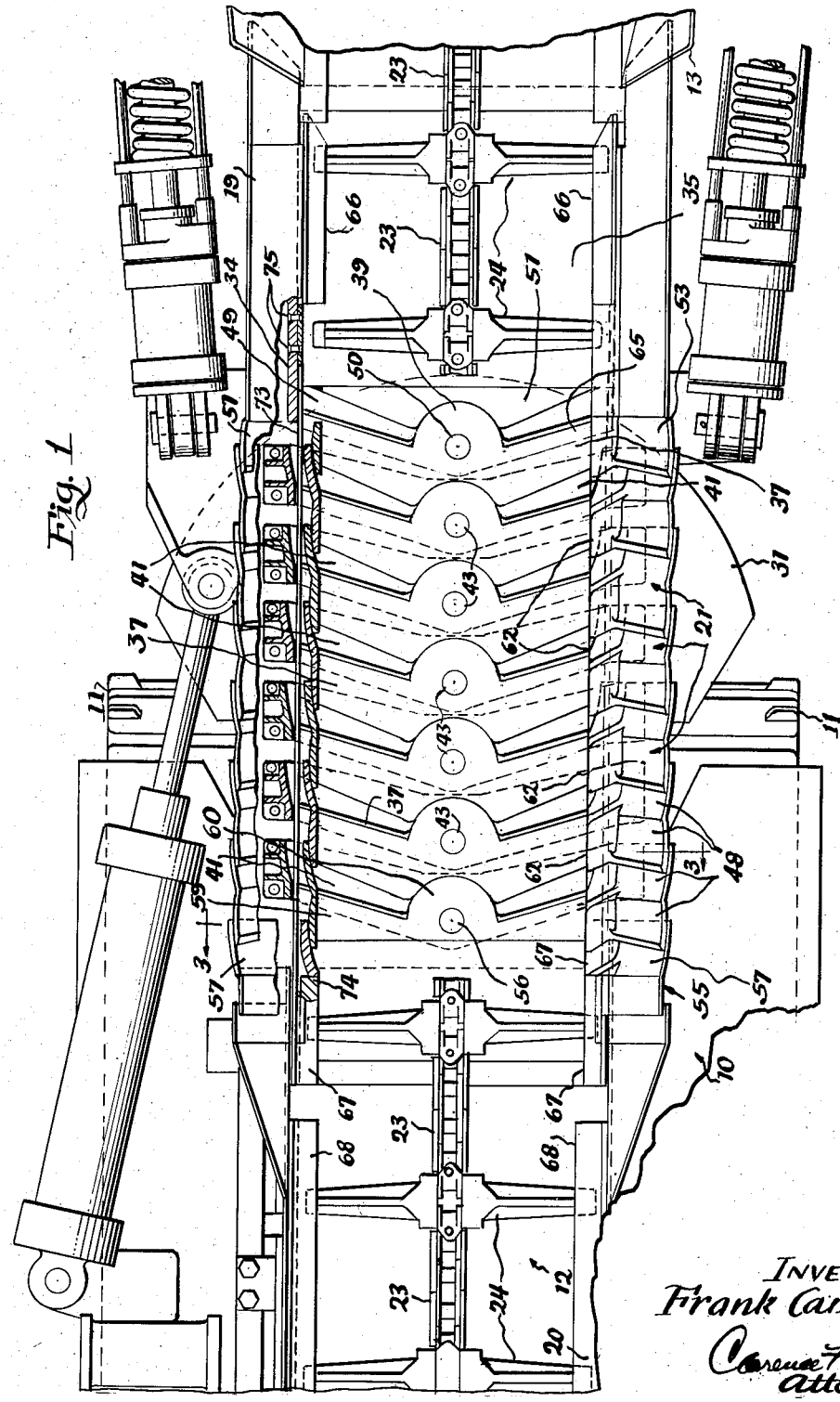
Figure 1 is a partial fragmentary plan view of the forward portion of a face loading machine having a conveyor constructed in accordance with my invention embodied therein, with certain parts of the conveyor broken away and certain other parts thereof shown in horizontal section.

Figure 5 is an enlarged detail view in side elevation of the trough segments of the conveyor, with certain parts shown in substantially longitudinal section in order to more clearly illustrate certain details thereof; and Figure 6 is an enlarged fragmentary plan view of several connected trough segments of the conveyor, with certain parts thereof broken away and certain other parts shown in substantially horizontal section.

In the drawings, the embodiment of my invention illustrated is shown as forming the conveying element of a face loading machine of a type similar to that shown and described in my Patent No. 2,388,385, and only herein shown and described in sufficient detail to make my present invention readily understandable.

The loading machine includes generally a main frame 10 mounted on two laterally spaced continuous tread devices 11 and having a gathering and loading element (not shown) projecting forwardly from its forward end, for picking up loose coal from the ground and loading it onto a conveyor 12, which may extend from a point adjacent the ground in advance of said main frame in an upwardly inclined direction and over the top thereof in a substantially horizontal plane and in an overhanging discharge position beyond the rear end thereof, for loading the coal gathered by said gathering and loading element into mine cars or the like.

The conveyor 12 includes an inclined trough 13 vertically movable about a transverse axis and laterally movable about a vertical axis coaxial with a dead shaft 14 and bearing boss 15. Said dead shaft and bearing boss form a pivotal bearing support for a laterally movable support frame 17, which forms a support for said inclined trough and the laterally swingable portion of the conveyor. A short horizontal trough 19 forms a continuation of said vertically adjustable inclined trough and is mounted on said support frame for lateral movement therewith. A relatively horizontal stationary trough 20 is spaced rearwardly of said trough 19 and extends along said main frame to the rear end thereof and forms a rearward continuation of the conveyor. The gap between said troughs 19 and 20 is closed in all positions of articulation of the conveyor to form a smooth trough permitting uninterrupted travel of coal by means of a plurality of interengaging pivotally connected trough segments 21, 21, as will hereinafter more clearly appear as this specification proceeds.

The material moving portion of the conveyor is of a well known form of center strand laterally flexible endless chain type of flight conveyor including an endless chain 23 made up of a plurality of aligned sections of chain vertically pivoted at their opposite ends to longitudinally spaced flights 24, 24, spacing said chain sections apart and guiding said chain for movement along the central portion of said troughs. Said endless chain and flights extend around a suitable direction changing device (not shown) at the forward end of the conveyor and upwardly along the inclined trough 13 and horizontal laterally movable trough 19. From thence said chain and flights extend along the trough segments 21, 21 to and along the stationary trough 20. From said stationary trough said chain and flights may extend along a laterally movable and vertically adjustable discharge trough (not shown) and reverse their direction of travel at the rear end of said trough.

The return run of the chain 23 and flights 24, 24 traveling beneath the troughs 20, 19 and 13 is guided between side walls 27, 27 depending from opposite sides of a bottom plate 29 of the trough 20 and is supported on a plate 30 extending along the top of said main frame. From thence said chain and flights are supported on a widened laterally extending substantially fan-shaped plate 31 extending a substantial distance in advance of said main frame. Said chain and flights while passing along said fan-shaped plate are guided between supporting feet 32, 32 of the trough segments 21, 21 along flexible wearing strips 33, 33 engaging the insides of said feet and secured to one of said troughs and having slidable engagement with the other of said troughs, as will hereinafter more clearly appear as this specification proceeds. From said trough segments, said chain and flights are guided between the insides of side walls 34, 34 of the short trough 19. Said side walls depend from opposite sides of a bottom plate 35 of said short trough and said chain and flights are supported on a plate 36 secured between the lower ends of said side walls while passing along said short trough. From thence said chains extend under a drive sprocket (not shown) coaxial with the axis of vertical adjustment of the trough 13 and are held in engagement with said sprocket by suitable idlers (not shown) as in my Patent No. 2,388,385. Said chain and flights then extend to the forward end of said trough where they reverse their direction of travel.

The trough segments 21, 21, as herein shown, each include a transverse plate 37 of a substantially wing-shaped formation and having an arcuate tongue 39 extending forwardly from its center and adapted to slidably engage an arcuate recess 40 formed in the rear portion of the next adjacent plate 37. A closure plate 41 is secured to the bottom of said transverse plate and extends rearwardly therefrom and underlaps the next adjacent plate 37 to as to form a closed bottom for the conveyor in all positions of articulation thereof. A pivotal pin 43 extends through the arcuate tongue 39 and the closure plate 41 to pivotally connect adjacent trough segments together for movement in a horizontal plane.

The feet 32, 32 are herein shown as being of a T-shaped formation, the stem of the T sliding on the laterally extending plate 31 at its end, and the cross of the T abutting the bottom of the closure plate 41 and being secured thereto by cap screws 44, 44. Said cap screws extend through opposite sides of the stem of the T and through said closure plate, and are threaded in flanges 45, 45 extending outwardly from the lower ends of vertical wall portions 46, 46 of outwardly flared side walls 47, 47. Said flared side walls extend angularly outwardly from the upper ends of said vertical wall portions 46, 46 and extend along the opposite sides of said transverse and said closure plates, to form the flared side walls of the trough segment. The insides of said flared side walls curve inwardly in opposite directions from a central peak to form two similar concave inner surfaces 48, 48. The outer surfaces of said side walls conform to the form of said inner surfaces and the rearward outer surface of each of said side walls is slidably engaged by the forward inner surface of the side wall of the next adjacent trough segment. Alternate inner and outer curved surfaces are thus slidably engaged by the outer and inner surfaces of the next adjacent trough segments so as to form a continuous flared trough when said trough segments are in various positions of articulation with respect to each other.

The transverse plate 37 of the first trough segment 21 overlaps a closure plate 49 and is pivotally connected thereto by means of a pivotal pin 50. Said closure plate is secured to the underside of a plate 51 as by welding, and extends rearwardly therefrom (see Figure 1). Said plate 51 abuts and extends rearwardly from the rear end of the plate 35 and is also secured thereto as by welding. Said plate 51 is of a form similar to the rear portion of the transverse plate 37 and has the tongue 39 of the first trough segment 21 recessed therein. Said closure plate 49 has vertical wall portions like the wall portions 46, 46 of the trough segments 21, 21 secured to its upper side and has outwardly flared curved side walls 53, 53 extending outwardly from the tops of said guide portions. Said side walls are of a form similar to the side walls 47, 47, but are of substantially half the length of said side walls and are of a single concave formation looking from the insides thereof. Said side walls abut and are secured to the rear edges of the side walls of the horizontal trough 19 and form rearwardly extending continuations thereof, the curved outsides of which are slidably engaged by the curved insides of the flared side walls of the first trough segment 21.

The last trough segment 21 is pivotally connected to a slidable trough section 55 by a pivotal pin 56. Said slidable trough section is guided in the receiving end of the trough 20 and is slidably mounted on the forward end of the plate 29, to take care of differences in length of the conveyor in its various positions of articulation. Said slidable trough has curved side wall portions 57, 57 corresponding to the curvature of the outsides of one half of the curved portions 48, 48 of the side walls 47, 47 and slidably engaging the outsides of said side walls. Said slidable trough also has a forwardly extending transverse plate 59 forming a continuation of its bottom and secured thereto, as by welding. Said plate is of substantially the same form as the form of the forward portion of the transverse plate 37 and has a forwardly projecting tongue 60 which is recessed within the rear recessed portion 40 of said plate 37 and is pivotally connected to the closure plate 41 of said last trough segment by the pivotal pin 56.

Each side wall 47 of each trough segment has a horizontal retaining flange 62 extending inwardly therefrom at the upper end of the vertical wall portion 46 thereof. Said flanges are so formed that a bottom 63 of one half of each flange slidably engages a top 64 of another half of the next adjacent flange. As herein shown, said top is formed of a plate secured to said side wall and underlapping and secured to said bottom 63 of the same flange. Similar flanges 65, 65 extend inwardly from the side walls 53, 53. Said flanges overlap the top 64 of the flange 62, and are in horizontal alignment with retaining flanges 66, which extend along the inner sides of opposite side walls 34, 34 of the short trough 19.

In a like manner, the slidable trough 55 is provided with retaining flanges 67, 67 in vertical alignment with retaining flanges 68, 68 extending along opposite side walls of the stationary trough 20, and having a portion 69 underlapping the bottom 63 of the flange 62 of the last trough segment 21.

The flanges 62, 62, 65, 65, 66, 66, 67, 67 and 69, 69 thus forming retaining hold-down guides for the ends of the flights 24, 24, to counteract the tendency of the chain 23 to twist during operation of the conveyor, when the inclined elevating trough 13 moves to its extreme laterally and downwardly displaced position with respect to the horizontal stationary trough 20.

The insides of the bottoms 63, 63 of the retaining flanges 62, 62 of the trough segments 21, 21 are gibbed as indicated by reference character 70 in Figure 3. The transverse plates 37, 37 have grooves formed therein in vertical alignment with the insides of the gibbed portions of said flanges, to provide slidable guides for opposite sides of flexible wearing strips 73, 73. Said wearing strips close the gaps between the vertical guide portions of said trough segments and form a uniform guide means for the ends of the flights 24, 24, when the conveyor is in various positions of articulation, to cause the conveyor chain 23 to travel substantially along the center of the conveyor from one trough to the other. The slidable trough 55 likewise has similar gibbed guides 74, 74 for the ends of said flexible wearing strips. The forward ends of said flexible wearing strips also extend along and are secured to the insides of the side walls 34, 34 of the short trough 19 as by rivets 75, 75. Said flexible wearing strips slidably engaging the insides of the vertical wall portions 46, 46 of the side walls 47, 47 and being secured at one of their ends to the trough 19 and slidably guided at their opposite ends in the slidable trough 55, uniformly bend upon articulation of the conveyor, and form a uniform guide for the chain 23 on the ends of the flights 24, 24 as said chain passes along the trough segments 21, 21 from the trough 19 to the trough 20.

In a similar manner the wearing strips 33, 33 guiding the lower run of the chain are secured at their forward ends to the depending side walls 34, 34 of the short trough 19 as by rivets 76, 76 (see Figure 2). Said wearing strips slidably engage the insides of the feet 32, 32 and close the gaps therebetween and extend along and slide laterally of the laterally extending plate 31 upon laterally swinging movement of the troughs 13 and 19. Said wearing strips are slidably guided at their ends opposite said trough 19 between the insides of the depending side walls of the trough 20 and guide strips 77, 77. Said guide strips are spaced inwardly of said side walls and are secured to and extend along the bottom plate 30 in parallel relation with respect to said walls, and with said side walls form a slidable guide for said wearing strips. Said wearing strips 33, 33 will thus bend uniformly with said trough segments and slidably engage the insides of the feet thereof and form a uniform guide for the return run of the chain 23 on the ends of the flights 24, 24 as the inclined trough 13 is swung laterally in one direction or another.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an articulated conveyor, two spaced troughs, one of which has an upwardly inclined portion leading upwardly towards the other and is vertically and horizontally swingable with respect to the other, a laterally flexible endless chain movable substantially along the longitudinal central portions of said troughs from one end of one trough to the opposite end of the other, longitudinally spaced flights projecting laterally in opposite directions from said chain and guiding said chain on their ends for movement along said troughs, a plurality of trough segments pivotally connected together and having interengaging side walls for bridging the gap between said troughs, retaining flanges extending inwardly of said side walls of said trough segments adjacent the lower ends thereof and having slidable engagement with each other to form a continuous hold-down means adapted to engage the upper sides of said flights, to restrain said chain from twisting when said horizontally and vertically movable trough is in its various inclined and laterally displaced positions with respect to said other trough, and two flexible wearing strips slidably engaging the insides of the side walls of said trough segments and held in position by said flanges and forming a uniformly curving guide means for said flights, for guiding said flights and chain from one trough to the other when said troughs are in various positions of articulation with respect to each other.

2. In an articulated conveyor, two spaced troughs, one of which has an upwardly inclined portion leading upwardly towards the other and is vertically and horizontally swingable with respect to the other, a laterally flexible endless chain movable along the longitudinal central portions of said troughs from one end of one trough to the opposite end of the other, longitudinally spaced flights projecting laterally in opposite directions from said chain and guiding said chain on their ends for movement along said troughs, a plurality of trough segments pivotally connected together and having interengaging side walls for bridging the gap between said troughs, retaining flanges extending inwardly of said side walls of said trough segments adjacent the lower ends thereof and having slidable engagement with each other to form a continuous hold-down means adapted to engage the upper sides of said flights, to restrain said chain from twisting when said horizontally and vertically movable trough is in its various inclined and laterally displaced positions with respect to said other trough, and two flexible wearing strips slidably engaging the insides of the side walls of said trough segments and held in position by said flanges and forming a uniformly curving guide means for said flights, for guiding said flights and chain from one trough to the other when said troughs are in various positions of articulation with respect to each other, said flexible wearing strips being secured at one of their ends to the insides of the side walls of one of said troughs and being slidably guided adjacent their opposite ends in the insides of the other of said troughs.

3. In an articulated conveyor, two spaced troughs, one of which is laterally swingable with respect to the other, a laterally flexible endless chain movable along the longitudinal central portions of said troughs from one end of one trough to the opposite end of the other, spaced apart flights projecting laterally in opposite directions from said chain and guiding said chain on their ends for movement along said troughs, a laterally extending plate disposed between said troughs and forming a support for the return run of said chain and flights when passing between said troughs, a plurality of pivotally connected trough segments connected between adjacent ends of said troughs and mounted on said plate for laterally slidable movement therealong, said trough segments each including a transverse plate supporting the upper run of said chain and flights and forming a material carrying surface of the conveyor, a plurality of laterally spaced feet slidably mounting said trough segments on said laterally extending plate and spacing said transverse plate above said laterally extending plate, vertical wall portions projecting upwardly from opposite sides of said transverse plate, curved flared interengaging wall portions flaring outwardly from said vertical wall portions and having slidable interengaging connection with the side walls of the next adjacent trough segments, and flexible wearing strips forming continuations of the side walls of said troughs above and below said transverse plate and slidably engaging the insides of said supporting feet and said vertical wall portions of said trough segments, for closing the gaps therebetween and guiding the upper and return runs of said chain and flights on the ends of said flights from one trough to the other when said troughs are in various positions of articulation with respect to each other.

4. In an articulated conveyor, two spaced troughs, one of which is laterally swingable with respect to the other, a laterally flexible endless chain movable along said troughs from one end of one trough to the opposite end of the other, longitudinally spaced flights projecting laterally in opposite directions from said chain, said troughs each including a bottom plate, material retaining side walls projecting upwardly therefrom and chain guiding side walls extending downwardly therefrom and the upper and lower runs of said chain being guided for movement between said side walls by engagement of the ends of said flights therewith, a laterally extending plate disposed between said troughs and forming a support for the return run of said chain and flights when passing between said troughs, a plurality of pivotally connected trough segments connected between adjacent ends of said troughs and bridging the gap therebetween, said trough segments each including a transverse plate forming a material carrying surface of the conveyor, a plurality of laterally spaced feet spacing said transverse plate above said laterally extending plate and mounting said transverse plate for lateral slidable movement along said laterally extending plate, vertical wall portions projecting upwardly from opposite sides of said transverse plate, and curved flared interengaging wall portions extending angularly outwardly from said vertical wall portions and having slidable interengaging connection with the side walls of the next adjacent trough segments, and a plurality of flexible wearing strips secured adjacent one of their ends to said upwardly and downwardly projecting side walls of one of said troughs and slidably guided in said upwardly and downwardly projecting side walls of said other trough and having slidable engagement with said vertical wall portions and with said feet of said trough segments, for closing the gaps therebetween and guiding the upper and return runs of said chain and flights on the ends of said flights while traveling from one trough to the other when said troughs are in various positions of articulation with respect to each other.

5. In an articulated conveyor, two spaced troughs, one of which is laterally swingable with respect to the other, a laterally flexible endless chain movable along the central portions of said troughs from one end of one trough to the opposite end of the other, spaced apart flights projecting laterally in opposite directions from said chain and guiding said chain on their ends for movement along said troughs, a laterally extending plate disposed between said troughs and forming a support for the return run of said chain and flights when passing between said troughs, a plurality of pivotally connected trough segments connected between adjacent ends of said troughs and mounted for laterally slidable movement along said plate, said trough segments each including a transverse plate spaced above said laterally extending plate and supporting the upper run of said chain and flights and forming a material carrying surface of the conveyor, vertical wall portions projecting upwardly from opposite sides of said transverse plate, retaining flanges extending inwardly of said vertical wall portions adjacent the upper extremities thereof having slidable interengaging connection with the retaining flanges of adjacent trough segments, and adapted to be engaged by the top portions of said flights to retain said flights in a relatively horizontal position during movement along said trough segments, said trough segments having laterally curved flared interengaging wall portions flaring outwardly from said retaining flanges and having slidable interengaging connection with the side walls of the next adjacent trough segments, and flexible wearing strips extending beneath said retaining flanges and held in position thereby and forming continuations of the side walls of said troughs and slidably engaging the insides of said vertical wall portions and forming uniformly curved guides for the ends of said flights, when said troughs are in various positions of articulation with respect to each other, for guiding said chain from one trough to the other.

6. In an articulated conveyor, two spaced troughs, one of which is laterally swingable with respect to the other, a laterally flexible endless chain movable along the central portions of said troughs from one end of one trough to the opposite end of the other, spaced apart flights projecting laterally in opposite directions from said chain and guiding said chain on their ends for movement along said troughs, a laterally extending plate disposed between said troughs and forming a support for the return run of said chain and flights when passing between said troughs, a plurality of pivotally connected trough segments connected between adjacent ends of said troughs and mounted for laterally slidable movement along said plate, said trough segments each including a transverse plate supporting the upper run of said chain and flights and forming a material carrying surface of the conveyor, a plurality of laterally spaced feet slidably mounted on and spacing said transverse plate above said laterally extending plate, vertical wall portions projecting upwardly from opposite sides of said transverse plate, retaining flanges extending inwardly of said vertical wall portions adjacent the upper extremities thereof, said retaining flanges having slidable interengaging connection with the retaining flanges of the next adjacent trough segments and being adapted to be engaged by the top portions of said flights, to retain said flights in a position substantially parallel to said laterally extending plates, and said trough segments having flared interengaging wall portions flaring outwardly from the upper outer portions of said retaining flanges and having slidable interengaging connection with the side walls of the next adjacent trough segments, two flexible wearing strips slidably engaging the insides of said vertical wall portions and two flexible wearing strips slidably engaging the insides of said feet and forming uniformly curved guides for the ends of said flights on the upper and lower runs of said chain when said troughs are in various positions of articulation with respect to each other, for guiding the upper and lower runs of said chain from one trough to the other.

7. In an articulated conveyor, two spaced troughs, one of which is laterally swingable with respect to the other, a flexible endless chain movable along said troughs from one end of one trough to the opposite end of the other, longitudinally spaced flights projecting laterally in opposite directions from said chain, said troughs each including a bottom plate, material retaining side walls projecting upwardly therefrom and chain guiding side walls extending downwardly therefrom, and the upper and lower runs of said chain being guided for movement between said side walls by engagement of the ends of said flights therewith, a laterally extending plate disposed between said troughs and forming a support for the return run of said chain and flights when passing between said troughs, a plurality of pivotally connected trough segments connected between adjacent ends of troughs and bridging the gap therebetween, said trough segments each including a transverse plate forming a material carrying surface of the conveyor, a plurality of laterally spaced feet slidably engaging said laterally extending plate and spacing said transverse plate above said laterally extending plate, vertical wall portions projecting upwardly from opposite sides of said transverse plate, retaining flanges extending inwardly of said vertical wall portions adjacent the upper extremities thereof said retaining flanges having slidable interengaging connection with the retaining flanges of the next adjacent trough segment and forming continuous retaining flanges serving to retain said flights to travel in planes substantially parallel to said transverse plates, said trough segments having laterally flared interengaging wall portions flaring outwardly from the upper outer portions of said retaining flanges and having slidable interengaging connection with the side walls of the next adjacent trough segments, and a plurality of flexible wearing strips secured adjacent one of their ends to said upwardly and downwardly projecting side walls of one of said troughs and slidably guided in said upwardly and downwardly projecting side walls of the other of said troughs and having slidable engagement with said vertical wall portions and with said feet of said trough segments and forming a uniform guide means for guiding the upper and lower runs of said chain on the ends of said flights while traveling from one trough to the other when said troughs are in various positions of articulation with respect to each other.

FRANK CARTLIDGE.

REFERENCES CITED

The following references are of record in the file of this patent:

UNITED STATES PATENTS

| Number | Name | Date |
|---|---|---|
| 2,216,546 | Cartlidge | Oct. 1, 1940 |
| 2,239,778 | Cartlidge | Apr. 29, 1941 |
| 2,388,385 | Cartlidge | Nov. 6, 1945 |